US012613574B2

(12) United States Patent
Mulliken et al.

(10) Patent No.: US 12,613,574 B2
(45) Date of Patent: Apr. 28, 2026

(54) HEAD-MOUNTED DEVICE WITH TENSION ADJUSTMENT

(71) Applicant: APPLE INC., Cupertino, CA (US)

(72) Inventors: Grant H. Mulliken, Sunnyvale, CA (US); David A. Kalinowski, San Francisco, CA (US); Brandon R. Neale, Fremont, CA (US); David A Schmuck, Mountain View, CA (US); Eric N. Vergo, San Jose, CA (US); Jae Hwang Lee, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/914,519

(22) Filed: Oct. 14, 2024

(65) Prior Publication Data

US 2025/0035942 A1    Jan. 30, 2025

Related U.S. Application Data

(63) Continuation of application No. 18/380,783, filed on Oct. 17, 2023, now Pat. No. 12,147,052, which is a
(Continued)

(51) Int. Cl.
| | |
|---|---|
| *G06F 3/01* | (2006.01) |
| *G01L 1/12* | (2006.01) |
| *G01L 1/16* | (2006.01) |
| *G01P 13/00* | (2006.01) |
| *G02B 27/00* | (2006.01) |
| *G02B 27/01* | (2006.01) |

(52) U.S. Cl.
CPC .............. *G06F 3/012* (2013.01); *G01L 1/127* (2013.01); *G01L 1/16* (2013.01); *G01P 13/00* (2013.01);
(Continued)

(58) Field of Classification Search
CPC ............ G02B 27/0176; G02B 27/0179; G02B 27/0093; G06F 3/012; G06F 3/013;
(Continued)

(56) References Cited

U.S. PATENT DOCUMENTS

| | | | |
|---|---|---|---|
| 9,128,283 B1 * | 9/2015 | Heinrich | .............. G02C 13/001 |
| 9,869,874 B2 | 1/2018 | Zhang | |

(Continued)

FOREIGN PATENT DOCUMENTS

| | | |
|---|---|---|
| CN | 107422849 A | 12/2017 |
| CN | 207571381 U | 7/2018 |

(Continued)

OTHER PUBLICATIONS

Machine translation of CN 109491093 (Year: 2019).*
Machine translation of CN 108124468 (Year: 2018).*

*Primary Examiner* — Xuemei Zheng
(74) *Attorney, Agent, or Firm* — Young Basile Hanlon & MacFarlane, P.C.

(57)    ABSTRACT

A head-mounted device includes a display device that is configured to display content to a user, a support structure including a contact pad configured to engage a face of the user to support the display device with respect to the face of the user, a sensor that generates a sensor output signal, and a tension adjuster configured to move the contact pad relative to the support structure based on the sensor output signal to restrain motion of the display device with respect to the face of the user.

20 Claims, 11 Drawing Sheets

Related U.S. Application Data continuation of application No. 17/009,460, filed on Sep. 1, 2020, now Pat. No. 11,822,091.

(60) Provisional application No. 62/895,208, filed on Sep. 3, 2019.

(51) Int. Cl.
  *G06F 1/16* (2006.01)
  *G01C 19/00* (2013.01)
  *G01P 15/00* (2006.01)

(52) U.S. Cl.
  CPC ..... *G02B 27/0093* (2013.01); *G02B 27/0176* (2013.01); *G02B 27/0179* (2013.01); *G06F 1/163* (2013.01); *G06F 3/013* (2013.01); *G01C 19/00* (2013.01); *G01P 15/00* (2013.01); *G02B 2027/0187* (2013.01)

(58) Field of Classification Search
  CPC . G06F 1/163; G01L 1/127; G01L 1/16; G01P 13/00
  See application file for complete search history.

(56) References Cited

U.S. PATENT DOCUMENTS

| | | | |
|---|---|---|---|
| 11,822,091 | B2 | 11/2023 | Mulliken et al. |
| 12,147,052 | B2 | 11/2024 | Mulliken et al. |
| 2004/0061663 | A1 | 4/2004 | Reynolds et al. |
| 2010/0105432 | A1 | 4/2010 | Sugahara |
| 2013/0249849 | A1 | 9/2013 | Wong et al. |
| 2016/0361512 | A1 | 12/2016 | Lawrenson |
| 2017/0202722 | A1 | 7/2017 | Lei et al. |
| 2017/0277254 | A1* | 9/2017 | Osman ................... A63F 13/32 |
| 2018/0046147 | A1 | 2/2018 | Aghara et al. |
| 2018/0096533 | A1 | 4/2018 | Osman |
| 2019/0056601 | A1* | 2/2019 | Lee ................... G02B 27/0176 |
| 2019/0079301 | A1 | 3/2019 | Sauers et al. |
| 2019/0094981 | A1 | 3/2019 | Bradski et al. |
| 2019/0101977 | A1 | 4/2019 | Armstrong-Muntner et al. |
| 2019/0156668 | A1 | 5/2019 | Liang et al. |
| 2019/0235619 | A1* | 8/2019 | Zou ......................... G06F 3/012 |
| 2019/0243414 | A1* | 8/2019 | Bae ................... G02B 27/0176 |
| 2019/0244518 | A1 | 8/2019 | Cheng et al. |
| 2019/0250651 | A1 | 8/2019 | Liu et al. |
| 2019/0324280 | A1 | 10/2019 | Yildiz et al. |
| 2020/0089003 | A1 | 3/2020 | Lee et al. |
| 2020/0238999 | A1 | 7/2020 | Batts et al. |
| 2020/0239031 | A1 | 7/2020 | Ran et al. |
| 2021/0118294 | A1 | 4/2021 | Ran et al. |
| 2021/0271092 | A1 | 9/2021 | Slipy et al. |

FOREIGN PATENT DOCUMENTS

| | | |
|---|---|---|
| CN | 208953789 U | 6/2019 |
| WO | 2020092635 A1 | 5/2020 |
| WO | 2020205597 A1 | 10/2020 |

* cited by examiner

HEAD MOUNTED DEVICE 100

DEVICE HOUSING 102

FACE SEAL 104

SUPPORT STRUCTURE 106

PROCESSOR 108

MEMORY 110

STORAGE DEVICE 112

COMMUNICATIONS DEVICE 114

SENSORS 116

POWER SOURCE 118

DISPLAY DEVICE 120

OPTICAL SYSTEM 122

TENSIONING DEVICE 124

TENSION CONTROLLER 126

TENSION ADJUSTER 128

834      836      826      838      828

| PRESSURE SENSOR | PRESSURE SIGNAL | TENSION CONTROLLER | TENSIONING COMMAND | TENSION ADJUSTER |

1234                 1236                 1226                 1238                 1228

2050

2150

HEAD-MOUNTED DEVICE WITH TENSION ADJUSTMENT

CROSS-REFERENCE TO RELATED APPLICATIONS

This application is a continuation of U.S. patent application Ser. No. 18/380,783, filed on Oct. 17, 2023, which is a continuation of U.S. patent application Ser. No. 17/009,460, filed on Sep. 1, 2020, and claims the benefit of U.S. Provisional Application No. 62/895,208, filed on Sep. 3, 2019, the contents of which are hereby incorporated by reference in their entirety for all purposes.

FIELD

The present disclosure relates generally to the field of head-mounted devices.

BACKGROUND

Head-mounted devices that display computer-generated reality content include display devices and optics that guide light from the display devices to a user's eyes. A support structure holds the device in place with respect to the user's head.

SUMMARY

One aspect of the disclosure is a head-mounted device. The head-mounted device includes a device housing, a support structure that is connected to the device housing to support the device housing with respect to a user, a display device that is connected to the device housing to display content, an optical system that is associated with the display device, and sensors that generate sensor output signals. The head-mounted device also includes a tension controller that determines a tensioning command based on the sensor output signals, and a tension adjuster that applies tension to the user according to the tensioning command in order to restrain motion of the device housing with respect to the user.

The support structure may include temple portions that are pivotable with respect to the device housing and the tension adjuster includes an active tensioning component that is configured to cause pivoting of the temple portions with respect to the device housing in accordance with the tensioning command. The active tensioning component may include an electric motor. The tension adjuster may include a passive tensioning component.

The tension adjuster may include a contact pad and an actuator that is connected to the contact pad to apply tension by movement of the contact pad. The contact pad may be a nose pad that is configured to engage a nose of a user.

The tension adjuster may include deployable contact features that are movable between a retracted position and an extended position.

The tension adjuster may include a hook portion that is configured to engage an ear of a user, the hook portion is connected to the support structure by a motorized hinge and the tension adjuster is configured to apply tension by causing movement of the hook portion using the motorized hinge.

The tension adjuster may include an actuator and a mass, and the tension adjuster is configured apply tension by moving the mass using the actuator.

The support structure may include temple portions and the tension adjuster is configured to apply tension by causing the temple portions to move between normal positions and curved positions.

The sensors may include a motion sensor, the sensor output signals include a motion signal, and the tension controller is configured to determine the tensioning command based on part on the motion signal.

The sensors may include an eye tracking camera, the sensor output signals include an eye tracking signal, and the tension controller is configured to determine the tensioning command based on part on the eye tracking signal.

The sensors may include a biometric sensor, the sensor output signals include a biometric signal, and the tension controller is configured to determine the tensioning command based on part on the biometric signal.

The sensors may include a pressure sensor, the sensor output signals include a pressure signal, and the tension controller is configured to determine the tensioning command based on part on the pressure signal. The pressure sensor may include a nose pad that is in engagement with a nose of the user.

The device housing and the support structure may define an eyeglasses-type configuration. The device housing and the support structure may define a goggles-type configuration. The device housing and the support structure may define a halo-type configuration.

Another aspect of the disclosure is a head-mounted device that includes a device housing, a support structure that is connected to the device housing to support the device housing with respect to a user, a display device that is connected to the device housing to display content, an optical system that is associated with the display device, sensors that generate sensor output signals, and a tension controller. The tension controller is configured to determine a user behavior profile using the sensor output signals, wherein the user behavior profile includes information that describes observed states over an extended time period. The tension controller is also configured to determine a motion prediction based on the sensor output signals and the user behavior profile. The tension controller is also configured to determine a tensioning command based on the motion prediction. The head-mounted device also includes a tension adjuster that applies tension to the user according to the tensioning command in order to restrain motion of the device housing with respect to the user.

Another aspect of the disclosure is a method for controlling tension applied by a tension adjuster of a head-mounted device. The method includes obtaining sensor output signals from sensors; determining a user behavior profile using the sensor output signals, wherein the user behavior profile includes information that describes observed states over an extended time period; determining a motion prediction based on the sensor output signals and the user behavior profile; determining a tensioning command based on the motion prediction; and applying tension using the tension adjuster according to the tensioning command.

DETAILED DESCRIPTION

The disclosure herein relates to head-mounted devices that are used to show computer-generated reality (CGR) content to users. The optical systems used by these head-mounted devices are typically dependent on a consistent positional relationship between the optical system and the user's eyes to produce images with good graphical fidelity. In virtual reality-type devices, relative motion of the optical system relative to the user's head may result in blurring and distortions. In augmented reality-type devices in which content is displayed on a translucent optical element so that the physical environment remains visible, relative motion of the optical system to the user's head may result in misalignment of computer-generated reality content relative to the physical environment as well as blurring and distortions.

Tensioning a head-mounted device such that it will resist movement with respect to a user's head under most circumstances (e.g., velocities, accelerations, and/or orientations of the user's head) may result in the user experiencing an uncomfortable feeling of tightness.

The systems and methods herein relate to features of head-mounted devices that are configured to provide an appropriate level of tension so that motion of the head-mounted device relative to the user's head is resisted. In some implementations, actively controlling tensioning features adjust the level of tension applied to the user's head by a support structure in response to a sensed condition (e.g., velocity, acceleration, and/or orientation of the user's head) or in anticipation of a future condition (e.g., velocity, acceleration, and/or orientation of the user's head).

Figure 1:
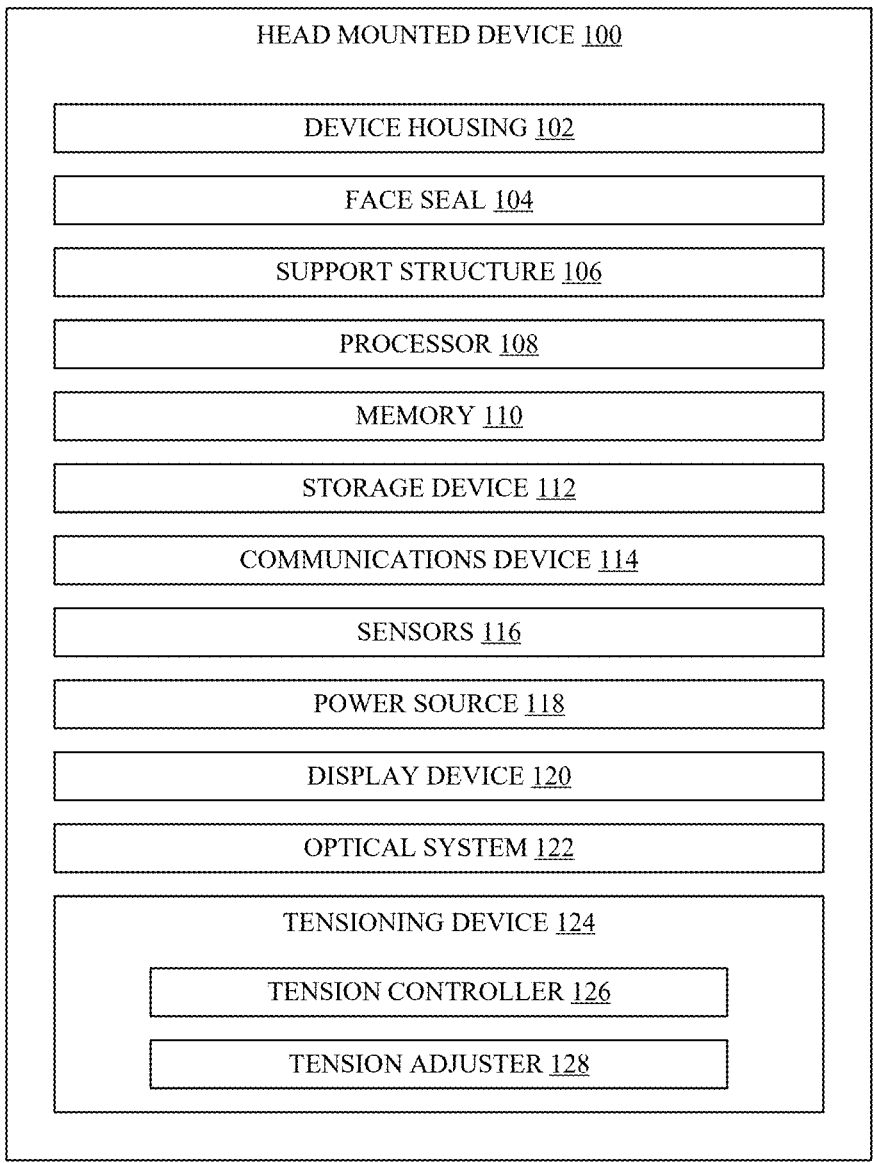
FIG. 1 is a block diagram that shows an example of a hardware configuration for a head-mounted device.

FIG. 1 is a block diagram that shows an example of a hardware configuration for a head-mounted device 100. The head-mounted device 100 is intended to be worn on the head of a user and includes components that are configured to display content to the user. Components that are included in the head-mounted device 100 may be configured to track motion of parts of the user's body, such as the user's head and hands. Motion tracking information that is obtained by components of the head-mounted device 100 can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

In the illustrated example, the head-mounted device 100 includes a device housing 102, a face seal 104, a support structure 106, a processor 108, a memory 110, a storage device 112, a communications device 114, sensors 116, a power source 118, a display device 120, an optical system 122, and a tensioning device 124.

The device housing 102 is a structure that supports various other components that are included in the head-mounted device 100. The device housing 102 may have a size and shape that corresponds generally to the width of an average person's head. The device housing 102 may have a height that corresponds generally to the distance between an average person's forehead and cheek bones such that it extends above and below the average person's orbital cavities. In one implementation, the device housing 102 may be a frame that other components of the head-mounted device 100 are connected to. The device housing 102 may be an enclosed structure such that certain components of the head-mounted device 100 are contained within the device housing 102 and thereby protected from damage.

The face seal 104 is connected to the device housing 102 and is located at areas around a periphery of the device housing 102 where contact with the user's face is likely. The face seal 104 functions to conform to portions of the user's face to allow the support structure 106 to be tensioned to an extent that will restrain motion of the device housing 102 with respect to the user's head. The face seal 104 may also function to reduce the amount of light from the physical environment around the user that reaches the user's eyes. The face seal 104 may contact areas of the user's face, such as the user's forehead, temples, and cheeks. The face seal 104 may be formed from a compressible material, such as open-cell foam or closed cell foam. In some implementations, the face seal 104 is omitted from the head-mounted device 100, such as when the head-mounted device 100 is implemented using an eyeglasses-type configuration.

The support structure 106 is connected to the device housing 102. The support structure 106 is a component or collection of components that function to secure the device housing 102 in place with respect to the user's head so that the device housing 102 is restrained from moving with respect to the user's head and maintains a comfortable position during use. The support structure 106 can be implemented using rigid structures, elastic flexible straps, or inelastic flexible straps.

The processor 108 is a device that is operable to execute computer program instructions and is operable to perform operations that are described by the computer program instructions. The processor 108 may be implemented using one or more conventional devices and/or more or more special-purpose devices. As examples, the processor 108 may be implemented using one or more central processing units, one or more graphics processing units, one or more application specific integrated circuits, and/or one or more field programmable gate arrays. The processor 108 may be provided with computer-executable instructions that cause the processor 108 to perform specific functions. The memory 110 may be one or more volatile, high-speed, short-term information storage devices such as random-access memory modules.

The storage device 112 is intended to allow for long term storage of computer program instructions and other data. Examples of suitable devices for use as the storage device 112 include non-volatile information storage devices of various types, such as a flash memory module, a hard drive, or a solid-state drive.

The communications device 114 supports wired or wireless communications with other devices. Any suitable wired or wireless communications protocol may be used.

The sensors 116 are components that are incorporated in the head-mounted device 100 to generate sensor output signals to are used as inputs by the processor 108 for use in generating CGR content and controlling tension, as will be described herein. The sensors 116 include components that facilitate motion tracking (e.g., head tracking and optionally handheld controller tracking in six degrees of freedom). The sensors 116 may also include additional sensors that are used by the device to generate and/or enhance the user's experience in any way. The sensors 116 may include conventional components such as cameras, infrared cameras, infrared emitters, depth cameras, structured-light sensing devices, accelerometers, gyroscopes, and magnetometers. The sensors 116 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 116. The information that is generated by the sensors 116 is provided to other components of the head-mounted device 100, such as the processor 108, as inputs.

The power source 118 supplies electrical power to components of the head-mounted device 100. In some implementations, the power source 118 is a wired connection to electrical power. In some implementations, the power source 118 may include a battery of any suitable type, such as a rechargeable battery. In implementations that include a battery, the head-mounted device 100 may include components that facilitate wired or wireless recharging.

The display device 120 is connected to the device housing 102 and functions to display content to the user. The display device 120 is a light-emitting display device, such as a video display of any suitable type, that is able to output images in response to a signal that is received from the processor 108. The display device 120 may be of the type that selectively illuminates individual display elements according to a color and intensity in accordance with pixel values from an image. As examples, the display device 120 may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 120 may include multiple individual display devices (e.g., two display screens or other display devices arranged side-by-side in correspondence to the user's left eye and the user's right eye).

The optical system 122 is associated with the display device 120 and is optically coupled to the display device 120. The optical system 122 is connected to the device housing 102 such that portions of the optical system 122 (e.g., lenses) are positioned adjacent to the user's eyes. The optical system 122 directs the emitted light from the display device 120 to the user's eyes. The optical system 122 may be configured isolate the emitted light from environment light (e.g., as in a virtual reality type system) or may be configured to combine the emitted light with environmental light such that a spatial correspondence is established between the emitted light and the environmental light (e.g., as in an augmented reality type system). The optical system 122 may include lenses, reflectors, polarizers, filters, optical combiners, and/or other optical components.

The tensioning device 124 is configured to adjust an amount of tension applied to the support structure 106 in order to maintain the position of the head-mounted device 100 relative to the user's head. The tensioning device 124 may include a tension controller 126 and a tension adjuster 128.

The tension controller 126 is configured to output tensioning commands to the tension adjuster 128. The tensioning commands control operation of the tension adjuster 128, such as by causing the tension adjuster 128 to set a specified amount of tension (e.g., using a force sensor under closed-loop control), to increase tension, or to decrease tension. The tension controller 126 may determine the tensioning commands based on a sensed condition. As an example, the tension controller 126 may command increased tension in response to increased velocity and/or acceleration or may command decreased tension in response to decreased velocity and/or acceleration, using inputs from the sensors 116.

The tension controller 126 may determine the tensioning commands based on a predicted future condition. The predicted future condition may be determined using inputs from the sensors 116 and/or based on the content that is output by the processor 108 for display to the user by the display device 120. For example, the content that is output by the processor 108 may include metadata that includes a code specifying an expected level of motion or a suggested tension level, and this metadata may be used as a basis for predictive tension control by the tension controller 126. Specific implementations of the tension controller 126 will be described herein.

The tension controller 126 is a device that is able to adjust and controller the amount of tension applied by the support structure 106. The tension controller 126 may be connected to or located in the device housing 102 and/or the support structure 106 of the head-mounted device 100. Specific implementations of the tension adjuster 128 will be described herein.

In some implementations of the head-mounted device 100, some or all of these components may be included in a separate device that is removable. For example, any or all of the processor 108, the memory 110, and/or the storage device 112, the communications device 114, and the sensors 116 may be incorporated in a device such as a smart phone that is connected (e.g., by docking) to the other portions of the head-mounted device 100.

In some implementations of the head-mounted device 100, the processor 108, the memory 110, and/or the storage device 112 are omitted, and the corresponding functions are performed by an external device that communicates with the head-mounted device 100. In such an implementation, the head-mounted device 100 may include components that support a data transfer connection with the external device using a wired connection or a wireless connection that is established using the communications device 114.

Examples of sensors, tension controllers, tension adjusters, and processes that can be incorporated in or used with the tensioning device 124 are described herein with respect to FIGS. 2-21. Any or all of these components may be included in the head-mounted device 100 and incorporated in or used with the tensioning device 124 in any combination, and the description of these components and processes is incorporated by reference in the description of the head-mounted device 100.

Figures 2, 3:
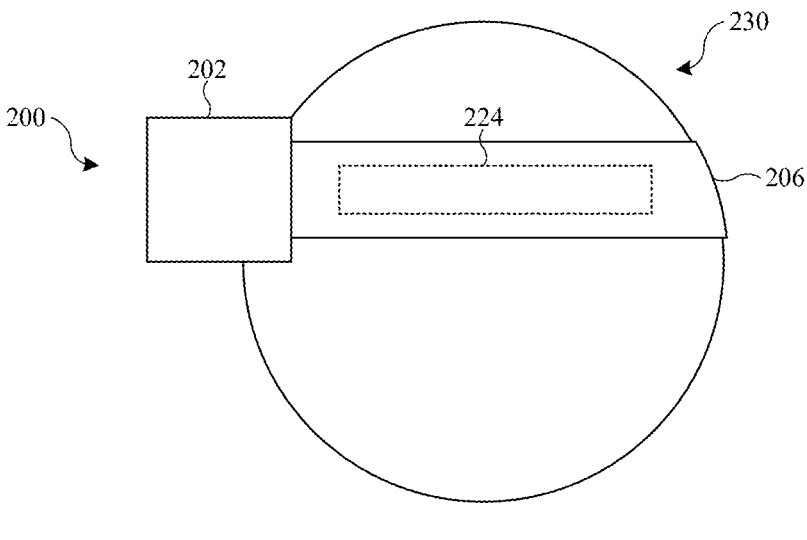
FIG. 2 is a side view illustration showing a head-mounted device having a goggles-type configuration worn on the head of a user.
FIG. 3 is a side view illustration showing a head-mounted device having a halo-type configuration worn on the head of a user.

FIG. 2 is a side view illustration showing a head-mounted device 200 having a goggles-type configuration worn on the head 230 of a user. The head-mounted device 200 is an example of a configuration that can be used to implement the head-mounted device 100. The description of the head-mounted device 100 is applicable to the head-mounted device 200, and the components and features described with respect to the head-mounted device 100 may be included in the head-mounted device 200.

The head-mounted device 200 includes a housing 202, a support structure in the form of a strap 206, and a tensioning device 224. The strap 206 is connected to the sides of the housing 202 and extends around the head 230 of the user to secure the housing 202 with respect to the head 230 of the user and to restrain relative motion. In some implementations, the strap 206 is rigid. In some implementations, the strap 206 is flexible. In some implementations, the strap 206 includes one or more rigid portions and one or more flexible portions. The tensioning device 224 is located in the strap 206 (as shown in FIG. 2), in the housing 202, or in both the housing 202 and the strap 206.

FIG. 3 is a side view illustration showing a head-mounted device 300 having a halo-type configuration worn on the head 330 of a user. The head-mounted device 300 is an example of a configuration that can be used to implement the head-mounted device 100. The description of the head-mounted device 100 is applicable to the head-mounted device 300, and the components and features described with respect to the head-mounted device 100 may be included in the head-mounted device 300.

The head-mounted device 300 includes a housing 302, a support structure in the form of a halo 306, and a tensioning device 324. The halo 306 is connected to top of the housing 302 such that the housing 302 is suspended form the halo 306. The halo 306 extends around the head 330 of the user to secure the housing 302 with respect to the head 330 of the user and restrain relative motion. The halo 306 may be oriented such that it is angled downwardly as viewed from a front-to-rear direction, such that a front end of the halo 306, from which the housing 302 is suspended, is higher than a rear end of the halo 306. The halo 306 is generally rigid and may be completely rigid or may include flexible portions. The tensioning device 324 is located in the halo

306 (as shown in FIG. 3), in the housing 302, or in both the housing 302 and the halo 306.

Figure 4:
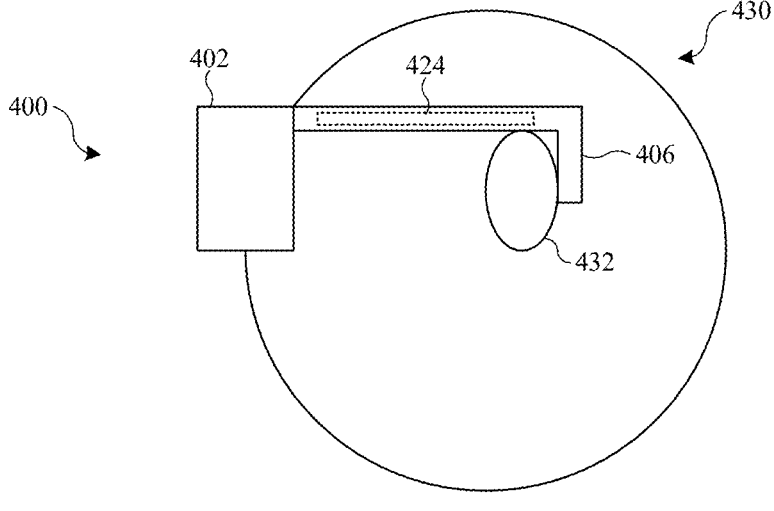
FIG. 4 is a side view illustration showing a head-mounted device having an eyeglasses-type configuration worn on the head of a user.

FIG. 4 is a side view illustration showing a head-mounted device 400 having an eyeglasses-type configuration worn on the head 430 of a user. The head-mounted device 400 is an example of a configuration that can be used to implement the head-mounted device 100. The description of the head-mounted device 100 is applicable to the head-mounted device 400, and the components and features described with respect to the head-mounted device 100 may be included in the head-mounted device 400.

The head-mounted device 400 includes a housing 402, a support structure in the form of temple portions 406, and a tensioning device 424. The temple portions 406 include two independent structures that are connected to the left and right sides, respectively, of the housing 402 in an eyeglasses-type configuration. As examples, the temple portions 406 may be connected to the housing 302 by a pivoting hinge, a living hinge, a ball joint, or other type of connector. The temple portions 406 are positioned adjacent to and in contact with the sides of head 430 of the user and may engage the ears 432 of the user in order to further restrain movement of the device housing 102 relative to the head of the user. The temple portions 406 are generally rigid and may be completely rigid or may include flexible portions. The tensioning device 424 is located in the temple portions 406 (as shown in FIG. 4), in the housing 402, or in both the housing 402 and the temple portions 406. Thus, head-mounted device 400 has a support structure that includes the temple portions 406, which are pivotable with respect to the housing 402 (e.g., the device housing) and the head-mounted device 400 has a tension adjuster, the tensioning device 434, which is an active tensioning component that is configured to cause pivoting of the temple portions 406 with respect to the housing 402 in accordance with a tensioning command.

Figure 5:
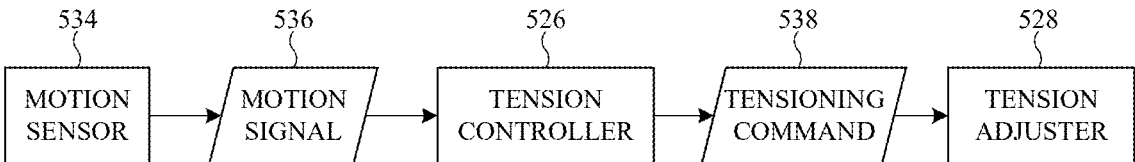
FIG. 5 is a block diagram that shows a tension controller according to a first example.

FIG. 5 is a block diagram that shows a tension controller 526 according to a first example. The tension controller 526 may be included in the head-mounted device 100 as per the description of the tension controller 126.

The tension controller 526 is connected to a motion sensor 534 that outputs a motion signal 536. The motion sensor 534 may be included in the sensors 116 of the head-mounted device 100. As examples, the motion sensor 534 could be located in a portion of a head-mounted device, such as in the device housing 102 or the support structure 106 of the head-mounted device 100.

The motion sensor 534 may be any type of device that is able to detect translation and/or rotation in one or more degrees of freedom. As one example, the motion sensor 534 may include one or more accelerometers. As one example, the motion sensor 534 may include one or more gyroscopes. In one implementation, the motion sensor 534 includes an inertial measurement unit that incorporates one or more accelerometers, gyroscopes, and/or magnetometers, and is configured to detect accelerations and velocities in three rotational degrees of freedom and three linear degrees of freedom.

The tension controller 526 receives the motion signal 536 from the motion sensor 534 and determines a tensioning command 538 that may be provided to a tension adjuster 528 as an input. The motion signal 536 may be output and transmitted to the tension controller 526 in any suitable manner. The tension adjuster 528 may be implemented according to the description of the tension adjuster 128 and further in accordance with the description of all other tension adjusters described herein. Operation of the tensioning command 538 and the tension adjuster 528 are as described with respect to the tension controller 126 and the tension adjuster 128.

The tension controller 526 may use the motion signal 536 by itself or in combination with signals that are output by other sensors (e.g., sensors that are included in the sensors 116 of the head-mounted device 100). The tensioning command 538 can be determined by the tension controller 526 based on the motion signal 536 in any suitable manner, such as by a function (e.g., linear or otherwise) that relates velocity and/or acceleration to tension applied by a tension adjuster. As one example, average velocity and/or acceleration during a time period can be used to determine the tensioning command 538. As another example, peak velocity and/or acceleration during a time period can be used to determine the tensioning command 538. As another example, velocity and/or acceleration values can be used to classify the motion currently being experienced by the user, for example, using a trained machine learning model. Motion classifications corresponding to motions such as running, walking, falling, and specific types of exercised may be detected by the tension controller 526 and used as a basis for applying tension, such as by applying a tension level that corresponds to each classification or by using each classification as a factor for determining tension along with other factors. The motion signal 536 may be used by the tension controller 526 to determine the tensioning command 538 under reactive or predictive control.

Figure 6:
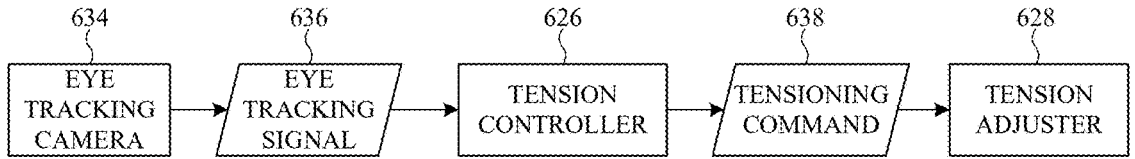
FIG. 6 is a block diagram that shows a tension controller according to a second example.

FIG. 6 is a block diagram that shows a tension controller 626 according to a second example. The tension controller 626 may be included in the head-mounted device 100 as per the description of the tension controller 126.

The tension controller 626 is connected to an eye tracking camera 634 that outputs an eye tracking signal 636. The eye tracking camera 634 may be included in the sensors 116 of the head-mounted device 100. As examples, the eye tracking camera 634 could be located in a portion of a head-mounted device, such as in the device housing 102, and oriented such that a field of view of the eye tracking camera 634 includes one or both of the user's eyes. The eye tracking camera 634 may include a single camera that is configured to obtain images of one or both of the user's eyes, or the eye tracking camera 630 may be an assembly that includes two cameras that are each configured to obtain images of one of the user's eyes.

The eye tracking camera 634 obtains images of the user's eyes. The images may be still images or may be a sequence of video frames. The images may be digital images that are defined by an array of pixels that each have a color value expressed using a color model.

The tension controller 626 receives the eye tracking signal 636 from the eye tracking camera 634 and determines a tensioning command 638 that may be provided to a tension adjuster 628 as an input. The eye tracking signal 636 may be output and transmitted to the tension controller 626 in any suitable manner. The tension adjuster 628 may be implemented according to the description of the tension adjuster 128 and further in accordance with the description of all other tension adjusters described herein. Operation of the tensioning command 638 and the tension adjuster 628 are as described with respect to the tension controller 126 and the tension adjuster 128.

The tension controller 626 may use the eye tracking signal 636 by itself or in combination with signals that are output by other sensors (e.g., sensors that are included in the sensors 116 of the head-mounted device 100). The tensioning command 638 can be determined by the tension controller 626 based on the eye tracking signal 636 in any suitable manner. The tension controller 626 interprets the eye tracking signal 636 is using machine vision techniques to determine a gaze angle and/or gaze distance for each of the user's eyes. The gaze angle and/or gaze distance can be tracked over time to define gaze data over a time period (e.g., several seconds immediately prior to the current time). An algorithm can be applied to the gaze data to classify the gaze data into a category that corresponds to a particular activity, such as reading, watching a movie, or playing a video game. Each of these categories can be associated with a tension level or can be associated with a factor that influences tension level when multiple signals are combined to determine tension. According to these or other techniques, the eye tracking signal 636 may be used by the tension controller 626 to determine the tensioning command 638 under reactive or predictive control.

Figure 7:
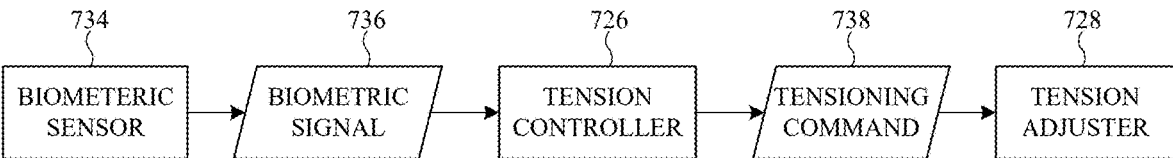
FIG. 7 is a block diagram that shows a tension controller according to a third example.

FIG. 7 is a block diagram that shows a tension controller 726 according to a third example. The tension controller 726 may be included in the head-mounted device 100 as per the description of the tension controller 126.

The tension controller 726 is connected to a biometric sensor 734 that outputs a biometric signal 736. The biometric sensor 734 may be included in the sensors 116 of the head-mounted device 100. As examples, the biometric sensor 734 could be connected to a portion of a head-mounted device, such as in the device housing 102 or in the support structure 106, and positioned such that it is able to obtain biometric signals. As one example, biometric sensor 734 may be a perspiration sensor, such as a galvanic skin response sensor. As one example, the biometric sensor 734 may be a temperature sensor such as a contact-based thermometer or a non-contact-based sensor such as an infrared sensor or infrared camera paired with an infrared emitter. As one example, the biometric sensor 734 may be a heart-rate sensor. In some implementations, the biometric sensor 734 is an assembly that includes multiple sensors.

The biometric sensor 734 obtains the biometric signal 736, which represents a biometric state of the user. The tension controller 726 receives the biometric signal 736 from the biometric sensor 734 and determines a tensioning command 738 that may be provided to a tension adjuster 728 as an input. The biometric signal 736 may be output and transmitted to the tension controller 726 in any suitable manner. The tension adjuster 728 may be implemented according to the description of the tension adjuster 128 and further in accordance with the description of all other tension adjusters described herein. Operation of the tensioning command 738 and the tension adjuster 728 are as described with respect to the tension controller 126 and the tension adjuster 128.

The tension controller 726 may use the biometric signal 736 by itself or in combination with signals that are output by other sensors (e.g., sensors that are included in the sensors 116 of the head-mounted device 100). The tensioning command 738 can be determined by the tension controller 726 based on the biometric signal 736 in any suitable manner. As an example, the tensioning command 738 be determined by tracking a nominal or baseline state for one or more biometric conditions, determining a deviation from the one or more biometric conditions, and determining a tension level based on the deviation. As one example, tension can be increased in correspondence with the degree of deviation of the one or more biometric conditions from the nominal state. As one example, a relationship between biometric conditions and tension levels can be learned using machine learning techniques, such as by training a deep neural network. According to these or other techniques, the biometric signal 736 may be used by the tension controller 726 to determine the tensioning command 738 under reactive or predictive control.

Figure 8:
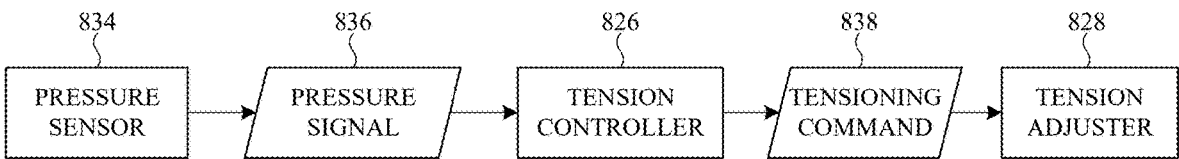
FIG. 8 is a block diagram that shows a tension controller according to a fourth example.

FIG. 8 is a block diagram that shows a tension controller 826 according to a fourth example. The tension controller 826 may be included in the head-mounted device 100 as per the description of the tension controller 126.

The tension controller 826 is connected to a pressure sensor 834 that outputs a pressure signal 836. The pressure sensor 834 may be included in the sensors 116 of the head-mounted device 100. As examples, the pressure sensor 834 could be connected to a portion of a head-mounted device, such as in the device housing 102 or in the support structure 106, and positioned such that it is directly or indirectly in contact with a portion of the user's body, such as the user's forehead, nose, temples, side of head, etc. As examples, the pressure sensor 834 may be implemented using a linear variable differential transformer or a piezoelectric device. In some implementations, the pressure sensor 834 is an assembly that includes multiple sensors.

The pressure sensor 834 obtains the pressure signal 836, which represents a pressure applied to a portion of the user's body by a component of the head-mounted device 100. The tension controller 826 receives the pressure signal 836 from the pressure sensor 834 and determines a tensioning command 838 that may be provided to a tension adjuster 828 as an input. The pressure signal 836 may be output and transmitted to the tension controller 826 in any suitable manner. The tension adjuster 828 may be implemented according to the description of the tension adjuster 128 and further in accordance with the description of all other tension adjusters described herein. Operation of the tensioning command 838 and the tension adjuster 828 are as described with respect to the tension controller 126 and the tension adjuster 128.

The tension controller 826 may use the pressure signal 836 by itself or in combination with signals that are output by other sensors (e.g., sensors that are included in the sensors 116 of the head-mounted device 100). The tensioning command 838 can be determined by the tension controller 826 based on the pressure signal 836 in any suitable manner. As an example, the tensioning command 838 be determined by tracking a nominal pressure value, determining a deviation from the nominal pressure value, and determining a tension level based on the deviation. As one example, tension can be increased in correspondence with the degree of deviation of the pressure values reported by one or more sensors from nominal pressure values experienced by each of the one or more sensors. As one example, a relationship between pressure values and tension levels can be learned using machine learning techniques, such as by training a deep neural network. According to these or other techniques, the pressure signal 836 may be used by the tension controller 826 to determine the tensioning command 838 under reactive or predictive control.

Figure 9:
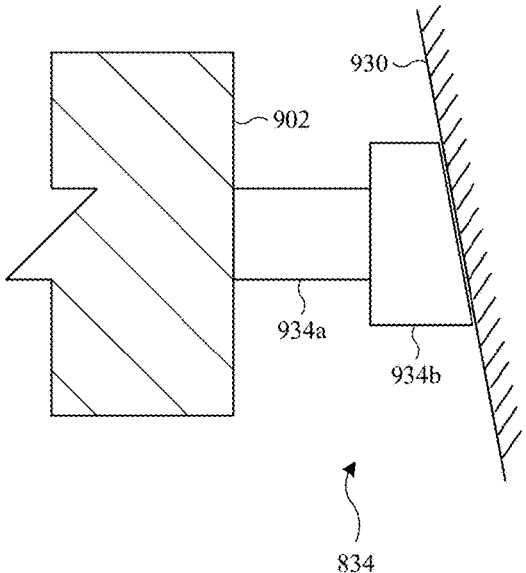
FIG. 9 is an illustration that shows an example implementation of a pressure sensor including a pressure transducer and a contact pad.

FIG. 9 is an illustration that shows an example implementation of the pressure sensor 834, including a pressure transducer 934a and a contact pad 934b. The pressure transducer 934a is connected to a housing portion 902 of a device housing, which may be the device housing 102 of the head-mounted device 100. The pressure transducer 934a is operable to output the pressure signal 836 in dependence on pressure applied to the contact pad 934b. The contact pad 934b is in contact with an area 930 of the user's body. The contact pad 934b may be a resilient structure to allow comfortable engagement relative to the user's body and to transmit forces resulting from that contact to the pressure transducer 934a. In the illustrated example, the housing portion 902 is part of a device that has an eyeglasses type configuration, and the contact pad 934b is a nose pad that is in contact with the user's nose for measuring pressure applied to the user's nose by the contact pad 934b.

Figure 10:
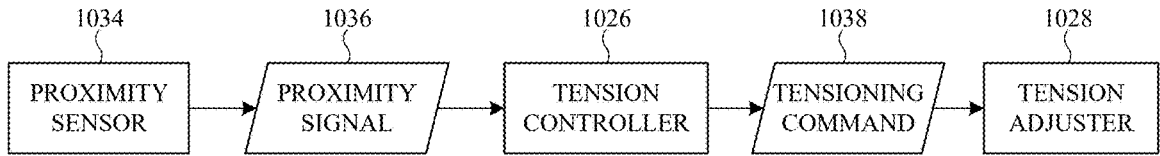
FIG. 10 is a block diagram that shows a tension controller according to a fifth example.

FIG. 10 is a block diagram that shows a tension controller 1026 according to a fifth example. The tension controller 1026 may be included in the head-mounted device 100 as per the description of the tension controller 126.

The tension controller 1026 is connected to a proximity sensor 1034 that outputs a proximity signal 1036. The proximity sensor 1034 may be included in the sensors 116 of the head-mounted device 100. As examples, the proximity sensor 1034 could be connected to a portion of a head-mounted device, such as in the device housing 102 or in the support structure 106, and positioned such that it is facing a portion of the user's body, such as the user's forehead, nose, temples, side of head, etc., and is positioned relatively close to the user (e.g., within 20 millimeters). As examples, the proximity sensor 1034 may be implemented using an infrared distance measuring device or an ultrasonic distance measuring device. In some implementations, the proximity sensor 1034 is an assembly that includes multiple sensors.

The proximity sensor 1034 obtains the proximity signal 1036, which represents a distance of the sensor to a portion of the user's body. The tension controller 1026 receives the proximity signal 1036 from the proximity sensor 1034 and determines a tensioning command 1038 that may be provided to a tension adjuster 1028 as an input. The proximity signal 1036 may be output and transmitted to the tension controller 1026 in any suitable manner. The tension adjuster 1028 may be implemented according to the description of the tension adjuster 128 and further in accordance with the description of all other tension adjusters described herein. Operation of the tensioning command 1038 and the tension adjuster 1028 are as described with respect to the tension controller 126 and the tension adjuster 128.

The tension controller 1026 may use the proximity signal 1036 by itself or in combination with signals that are output by other sensors (e.g., sensors that are included in the sensors 116 of the head-mounted device 100). The tensioning command 1038 can be determined by the tension controller 1026 based on the proximity signal 1036 in any suitable manner. As an example, the tensioning command 1038 be determined by tracking a nominal proximity value, determining a deviation from the nominal proximity value, and determining a tension level based on the deviation. As one example, tension can be increased in correspondence with the degree of deviation of the proximity values reported by one or more sensors from nominal proximity values experienced by each of the one or more sensors. As one example, a relationship between proximity values and tension levels can be learned using machine learning techniques, such as by training a deep neural network. According to these or other techniques, the proximity signal 1036 may be used by the tension controller 1026 to determine the tensioning command 1038 under reactive or predictive control.

Figure 11:
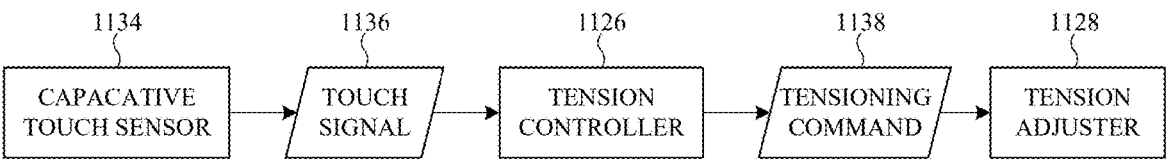
FIG. 11 is a block diagram that shows a tension controller according to a sixth example.

FIG. 11 is a block diagram that shows a tension controller 1126 according to a sixth example. The tension controller 1126 may be included in the head-mounted device 100 as per the description of the tension controller 126.

The tension controller 1126 is connected to a capacitive touch sensor 1134 that outputs a capacitive touch signal 1136. The capacitive touch sensor 1134 may be included in the sensors 116 of the head-mounted device 100. As examples, the capacitive touch sensor 1134 could be connected to a portion of a head-mounted device, such as in the device housing 102 or in the support structure 106. In some implementations, the capacitive touch sensor 1134 is positioned such that it is directly in contact with a portion of the user's body, such as the user's forehead, nose, temples, side of head, etc. In some implementations, the capacitive touch sensor 1134 is positioned such that it is located on an outwardly-facing surface of the head-mounted device 100, such as on an outwardly-facing surface of the device housing 102 or the support structure 106 of the head-mounted device 100. In some implementations, the capacitive touch sensor 1134 is an assembly that includes multiple sensors.

The capacitive touch sensor 1134 obtains the capacitive touch signal 1136, which represents a contact with a anything that is conductive or has a dielectric constant that is different than the dielectric constant of air. The capacitive touch signal 1136 may represent a location and/or magnitude of a touch, and is therefore useful to determine contact with a user's body, lack of contact with a user's body, and motion of the user's body relative to the capacitive touch sensor 1134. The tension controller 1126 receives the capacitive touch signal 1136 from the capacitive touch sensor 1134 and determines a tensioning command 1138 that may be provided to a tension adjuster 1128 as an input. The capacitive touch signal 1136 may be output and transmitted to the tension controller 1126 in any suitable manner. The tension adjuster 1128 may be implemented according to the description of the tension adjuster 128 and further in accordance with the description of all other tension adjusters described herein. Operation of the tensioning command 1138 and the tension adjuster 1128 are as described with respect to the tension controller 126 and the tension adjuster 128.

The tension controller 1126 may use the capacitive touch signal 1136 by itself or in combination with signals that are output by other sensors (e.g., sensors that are included in the sensors 116 of the head-mounted device 100). The tensioning command 1138 can be determined by the tension controller 1126 based on the capacitive touch signal 1136 in any suitable manner. As an example, the tensioning command 1138 be determined by determining an amount of motion of the user's body (e.g., the user's head) relative to the capacitive touch sensor 1134 and determining a tension level based on the amount of motion. Accordingly, the capacitive touch signal can be used to detect slipping of the device housing 102 and/or the support structure 106 of the head-mounted device 100 with respect to the head of the user and tension can be applied in response by outputting the tensioning command 1138 and applying tension using the tension adjuster 1128 in response.

As one example, in the case of an outwardly oriented position for the capacitive touch sensor 1134, a first tension value can be applied in the absence of a touch and a second, lower tension value (which may be an absence of applied tension) can be applied in the presence of a touch (e.g., by the user's hand). Applying a lower tension value in the presence of a touch on an outwardly facing portion of the device allows tension to be released by the tension adjuster 1128 when the user grasps the device with their hands.

As one example, tension can be increased in correspondence with the amount of motion. As one example, a relationship between capacitive touch values and tension levels can be learned using machine learning techniques, such as by training a deep neural network.

According to these or other techniques, the capacitive touch signal 1136 may be used by the tension controller 1126 to determine the tensioning command 1138 under reactive or predictive control.

Figure 12:
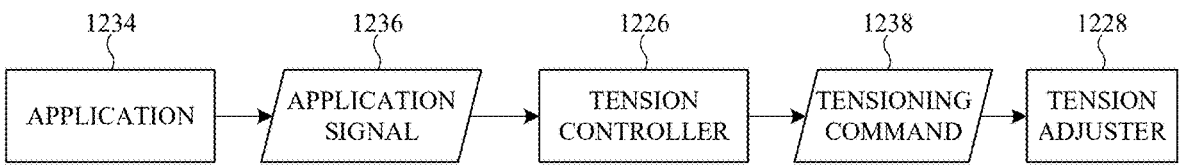
FIG. 12 is a block diagram that shows a tension controller according to a seventh example.

FIG. 12 is a block diagram that shows a tension controller 1226 according to a seventh example. The tension controller 1226 may be included in the head-mounted device 100 as per the description of the tension controller 126.

The tension controller 1226 is in communication (e.g., via an application programming interface) with an application 1234 that outputs an application signal 1236. As examples, the application 1234 could be a fitness application, a gaming application, a video player application, a newsreader application, etc. The application 1234 may output the application signal 1236 such that it indicates an application type, a type of activity that the user is engaged in, or a desired tension level.

The tension controller 1226 receives the application signal 1236 from the application 1234 and determines a tensioning command 1238 that may be provided to a tension adjuster 1228 as an input. The application signal 1236 may be output and transmitted to the tension controller 1226 in any suitable manner. The tension adjuster 1228 may be implemented according to the description of the tension adjuster 128 and further in accordance with the description of all other tension adjusters described herein. Operation of the tensioning command 1238 and the tension adjuster 1228 are as described with respect to the tension controller 126 and the tension adjuster 128.

The tension controller 1226 may use the application signal 1236 by itself or in combination with signals that are output by other sensors (e.g., sensors that are included in the sensors 116 of the head-mounted device 100). The tensioning command 1238 can be determined by the tension controller 1226 based on the application signal 1236 in any suitable manner. As an example, the tensioning command 1238 be determined based on a predetermined tension level that is set for a specification application, a category of application, or an activity type. As an example, the tensioning command 1238 may be determined by using information describing specification application, a category of application, or an activity type as a factor along with other factors based on inputs received from other sensors. According to these or other techniques, the application signal 1236 may be used by the tension controller 1226 to determine the tensioning command 1238 under reactive or predictive control.

Figure 13:
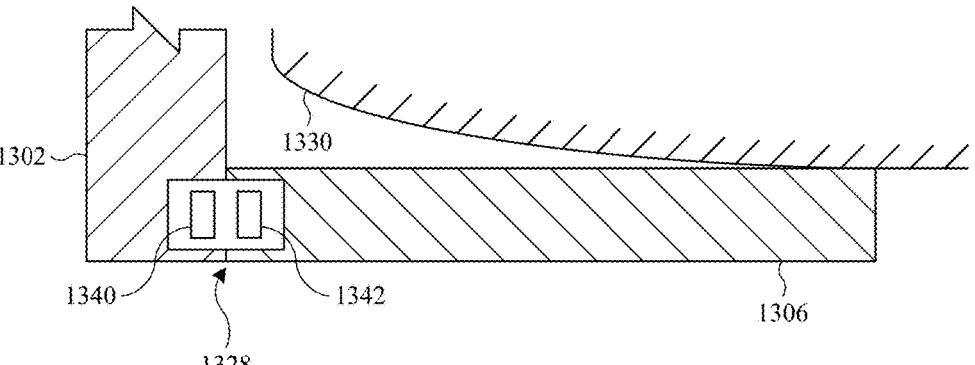
FIG. 13 is an illustration that shows a tension adjuster according to a first example.

FIG. 13 is an illustration that shows a tension adjuster 1328 according to a first example which includes an active tension adjuster such as a motor that moves portions of a device to apply tension. The tension adjuster 1328 may be included in the head-mounted device 100 as per the description of the tension adjuster 128. The tension adjuster 1328 may be used with any of the tension controllers described with respect to FIGS. 5-12.

In the illustrated example, the tension adjuster 1328 is implemented in an eyeglasses-type device (as per the head-mounted device 400) having a device housing 1302 and a support structure in the form of temple portions that secure the device relative to a head 1330 of the user. A temple portion 1306 is illustrated in FIG. 13, with an equivalent structure (not shown) positioned for engagement with an opposite surface of the head 1330 of the user.

The tension adjuster 1328 is a hinge structure that is configured to connect the temple portion 1306 to the device housing 1302 in a manner that allows pivoting of the temple portion 1306 with respect to the device housing 1302 in directions that correspond to movement toward the head 1330 of the user and movement away from the head 1330 of the user. The tension adjuster 1328 includes a passive tensioning component 1340 and an active tensioning component 1342. The passive tensioning component 1340 may be a spring or other element that is able to apply a biasing force that urges the temple portion 1306 toward a neutral position. The neutral position of the passive tensioning component 1340 may include application of tension to the head of the user. The active tensioning component 1342 is configured to move the temple portion 1306 to apply tension to the head 1330 of the user according to a tensioning command that is output by a tension controller, as previously described. The active tensioning component 1342 may include, for example, an electric motor having controllable motion (e.g., using a motion encoder and feedback control or a stepper motor) that is operable to apply tension according to a tensioning command by applying torque to the hinge structure that urges the temple portion 1306 to pivot toward the head 1330 of the user. The amount of tension applied by the active tensioning component 1342 may vary from no tension to a maximum tension that is greater than the tension applied by the passive tensioning component 1340.

Figure 14:
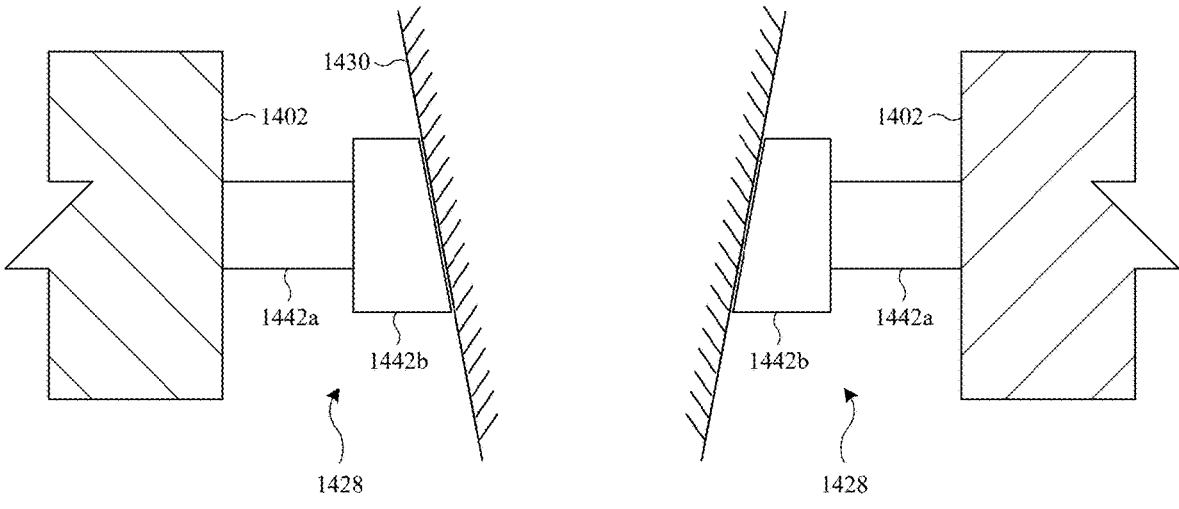
FIG. 14 is an illustration that shows a tension adjuster according to a second example.

FIG. 14 is an illustration that shows a tension adjuster 1428 according to a second example which includes application of active tension adjustment at the nose pad of a head-mounted device, such as an eyeglasses type device. The tension adjuster 1428 may be included in the head-mounted device 100 as per the description of the tension adjuster 128. The tension adjuster 1428 may be used with any of the tension controllers described with respect to FIGS. 5-12.

In the illustrated example, the tension adjuster 1428 is implemented in an eyeglasses-type device (as per the head-mounted device 400) having a device housing 1402. A nose 1430 of the user is positioned between two parts of the device housing 1402, and the tension adjuster 1428 is in the form of two actuated nose pads that are configured to vary tension by clamping and unclamping relative to the nose 1430 of the user. Each nose pad of the tension adjuster 1428 includes an actuator 1442a and a contact pad 1442b. The actuator 1442a is configured to urge the contact pad 1442b into engagement with the nose 1430 at a variable tension according to a tensioning signal received from a tension controller, as previously described.

Figure 15:
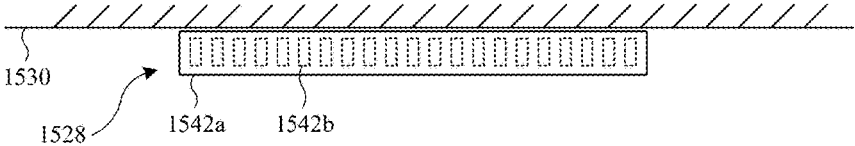
FIG. 15 is an illustration that shows a tension adjuster according to a third example with deployable contact features in a retracted position.
Figure 16:
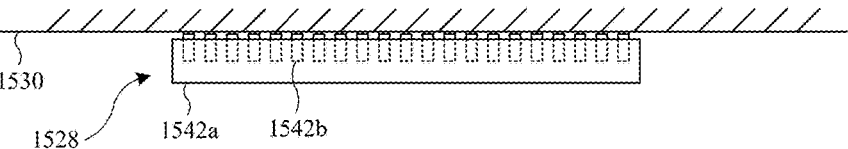
FIG. 16 is an illustration that shows a tension adjuster according to a third example with deployable contact features in an extended position.

FIGS. 15-16 are illustrations that shows a tension adjuster 1528 according to a third example which includes application of active tension adjustment by selectively deploying contact features (e.g., high-friction features) from a portion of the device that otherwise passively contacts the user. The contact features are movable between a retracted position (FIG. 15) and an extended position (FIG. 16). The contact features may be positioned to contact a body portion 1530 of the user, which may be, as examples, the user's nose, forehead, and/or temples. The tension adjuster 1528 may be included in the head-mounted device 100 as per the description of the tension adjuster 128. The tension adjuster 1528 may be used with any of the tension controllers described with respect to FIGS. 5-12.

In the illustrated example, the tension adjuster 1528 includes a passive contact structure 1542a and deployable contact features 1542b. The passive contact structure 1542a may be, as examples, a nose pad connected to a device housing or may be located on a support structure as previously described. The deployable contact features 1542b are movable between the retracted position (FIG. 15) and the extended position (FIG. 16) in response to the tensioning signal received from a tension controller, as previously described, in order to increase tension relative to the user's body and restrain motion of the device relative to the user.

In one example, the deployable contact features 1542b are not engaged with the body portion 1530 of the user in the retracted position and the deployable contact features 1542b are engaged with the body portion 1530 of the user in the deployed position. In another example, the deployable contact features 1542b are engaged with and apply a first magnitude of force to the body portion 1530 of the user in the retracted position and the deployable contact features 1542b are engaged with and apply a second magnitude of force to the body portion 1530 of the user in the deployed position, wherein second magnitude of force is greater than the first magnitude of force. In another example, the deployable contact features 1542b are located in the passive contact structure 1542a in the retracted position and the deployable contact features 1542b are moved so that they extend out of the passive contact structure 1542a and are engaged with the body portion 1530 of the user in the deployed position.

The deployable contact features 1542b may include a motor or other electromechanical or electrical actuator to move the deployable contact features 1542b. The deployable contact features 1542b may be high-friction features, such as a surface having a higher friction value than the passive contact structure 1542a or an array of individual structures (e.g., protrusions, fingers, bristle-like structures, hair-like structures, etc.) that engage the user's body. In some implementations, the deployable contact features 1542b include microstructures (e.g., bristle-like structures or hair-like structures) that are configured to cause motion in a specific direction when vibrated, and the deployable contact features 1542b include a vibrating component that, when active, causes motion of the tension adjuster 1528 with respect to the body portion 1530 of the user in order to oppose motion of the device with respect to the body portion 1530 of the user.

Figure 17:
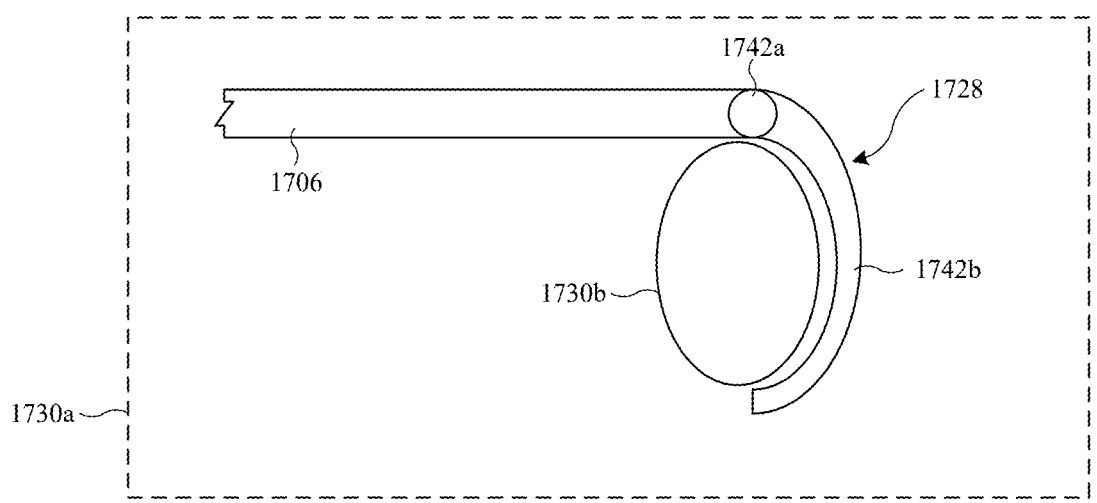
FIG. 17 is an illustration that shows a tension adjuster according to a fourth example.

FIG. 17 is an illustration that shows a tension adjuster 1728 according to a fourth example which includes application of active tension adjustment using an actuated structure adjacent to the user's ears. The tension adjuster 1728 may be included in the head-mounted device 100 as per the description of the tension adjuster 128. The tension adjuster 1728 may be used with any of the tension controllers described with respect to FIGS. 5-12.

In the illustrated example, the tension adjuster 1728 is implemented in an eyeglasses-type device (as per the head-mounted device 400) having a support structure in the form of a temple portion 1706. An equivalent structure can be used at the opposite side of a head 1730a of the user. The tension adjuster 1728 includes a motorized hinge 1742a and a hook portion 1742b. To increase tension in response to a tensioning command from a tension controller, as previously described, the motorized hinge 1742a urges the hook portion 1742b toward engagement with an ear 1730b of the user. To decrease tension in response to a tensioning command from a tension controller, as previously described, the motorized hinge 1742a urges the hook portion 1742b away from engagement with the ear 1730b of the user.

Figure 18:
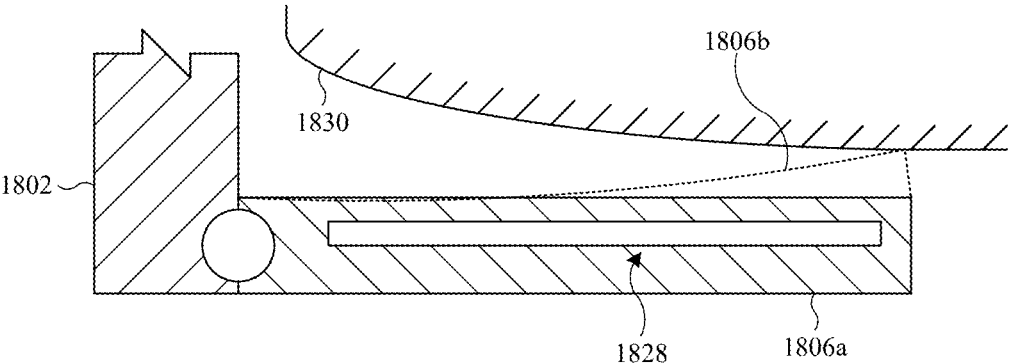
FIG. 18 is an illustration that shows a tension adjuster according to a fifth example.

FIG. 18 is an illustration that shows a tension adjuster 1828 according to a fifth example which includes application of active tension adjustment using actuated curvature of a support structure such as a temple portion of an eyeglasses type device. The tension adjuster 1828 may be included in the head-mounted device 100 as per the description of the tension adjuster 128. The tension adjuster 1828 may be used with any of the tension controllers described with respect to FIGS. 5-12.

In the illustrated example, the tension adjuster 1828 is implemented in an eyeglasses-type device (as per the head-mounted device 400) having a device housing 1802 and a support structure in the form of a temple portion 1806a. An equivalent structure can be used at the opposite side of a head 1830 of the user. The tension adjuster 1828 is configured to actively control curvature of the temple portion 1806a to increase and decrease tension in response to a tensioning command from a tension controller, as previously described. For example, increasing tension applied by the temple portion 1806a using the tension adjuster 1828 can cause the temple portion 1806a to change shape from a normal position to a curved position 1806b. Thus, the tension adjuster 1828 is configured to apply and release tension by moving the temple portion 1806a between the normal position and the curved position. As examples, the tension adjuster 1828 may change the curvature of the temple portion 1806a using an actuated cable that applies tension along the length of the temple portion 1806a, by causing relative motion of a parallel plate structure included in the temple portion 1806a, or using other suitable structures known in the mechanical arts.

Figure 19:
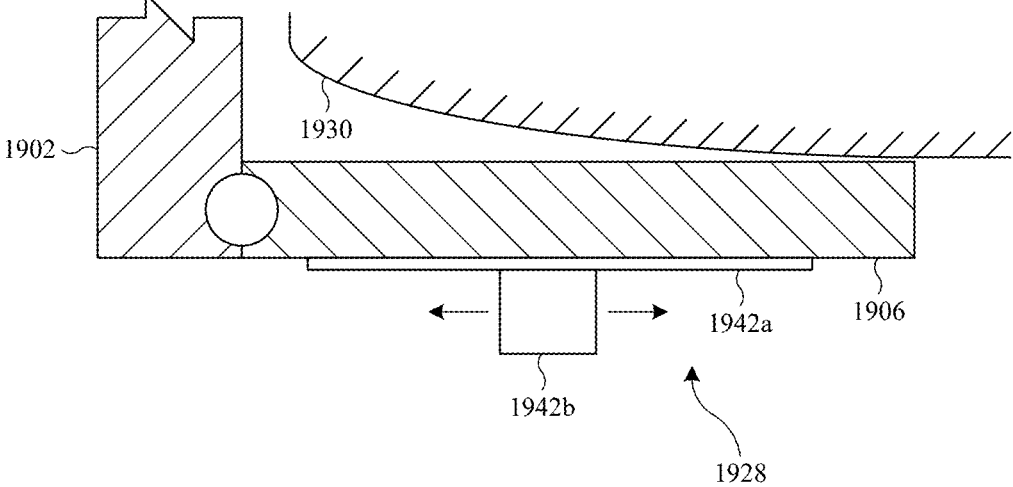
FIG. 19 is an illustration that shows a tension adjuster according to a sixth example.

FIG. 19 is an illustration that shows a tension adjuster 1928 according to a sixth example which includes a moving mass to change tension. The tension adjuster 1928 may be included in the head-mounted device 100 as per the description of the tension adjuster 128. The tension adjuster 1928 may be used with any of the tension controllers described with respect to FIGS. 5-12.

In the illustrated example, the tension adjuster 1928 is implemented in an eyeglasses-type device (as per the head-mounted device 400) having a device housing 1902 and a support structure in the form of a temple portion 1906. An equivalent structure can be used at the opposite side of a head 1930 of the user. The tension adjuster 1928 is configured to change tension applied to the head 1930 of the user using an actuator 1942a to change a position of a mass 1942b relative to the temple portion 1906, such as by linear motion in a longitudinal direction along the temple portion 1906, as in the illustrated example, or by lateral motion relative to the temple portion 1906. Other configurations may be used.

Other active tension adjusting features can be incorporated in the head-mounted devices that are described herein. As one example, a tension adjuster includes a gravity driven mass that moves a bi-stable mechanism from a first position to a second position, and a magnet connected to the bi-stable mechanism causes the support structure of the device to loosen or tighten in response to movement of the bi-stable mechanism to the first position or the second position. As another example, tension may be applied or released by asymmetric motion of a haptic feedback device. As another example, a vibrational gyroscope may be used to apply or release tension.

Passive tension adjusting and/or motion restraining features may also be incorporated in the head-mounted devices that are described herein. As one example, negative air pressure may be generated in a cavity that contacts the user to restrain motion in response to high acceleration. As another example, a portion of the device, such as a nose pad, may be provided with bristle-like or hair-like engaging structures that apply a directional biasing force to the device. As another example, portions of the device may be treated with oleophobic coatings to create regions where substances such as sweat and oil are expelled to increase available friction.

The features described with respect to the various implementations that are described herein can be combined into a single head-mounted device. Thus, a single head-mounted device can be implemented that includes features from one or more of the tensioning devices, tension controllers, and tension adjusters that are described herein, such as the tensioning device 124, the tensioning device 224, the tensioning device 324, the tensioning device 424, the tension controller 126, the tension controller 526, the tension controller 626, the tension controller 726, the tension controller 826, the tension controller 1026, the tension controller 1126, the tension controller 1226, the tension adjuster 128, the tension adjuster 528, the tension adjuster 628, the tension adjuster 728, the tension adjuster 828, the tension adjuster 1028, the tension adjuster 1128, the tension adjuster 1228, the tension adjuster 1328, the tension adjuster 1428, the tension adjuster 1528, the tension adjuster 1728, the tension adjuster 1828, and the tension adjuster 1928.

Figure 20:
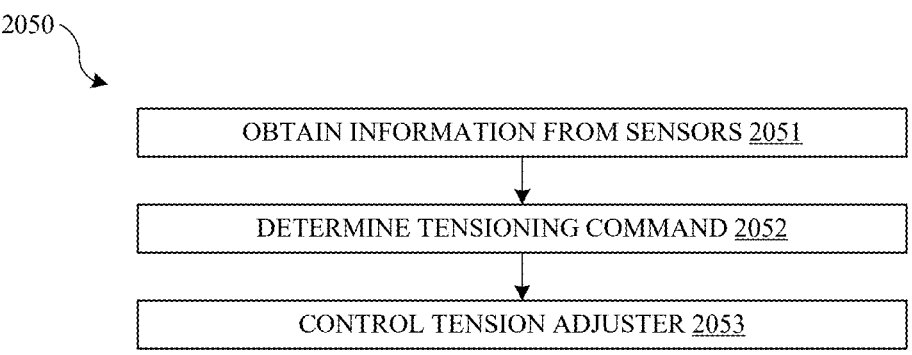
FIG. 20 is a flowchart that shows a process for controlling tension of a head-mounted device according to a first example.

FIG. 20 is a flowchart that shows a process 2050 for controlling tension of a head-mounted device according to a first example. The process 2050 can be performed using the head-mounted devices described herein, including the head-mounted device 100, the head-mounted device 200, the head-mounted device 300, and the head-mounted device 400.

The process 2050 may include use of the tensioning devices, tension controllers, and tension adjusters that are described herein, such as the tensioning device 124, the tensioning device 226, the tensioning device 324, the tensioning device 424, the tension controller 126, the tension controller 526, the tension controller 626, the tension controller 726, the tension controller 826, the tension controller 1026, the tension controller 1126, the tension controller 1226, the tension adjuster 128, the tension adjuster 528, the tension adjuster 628, the tension adjuster 728, the tension adjuster 828, the tension adjuster 1028, the tension adjuster 1128, the tension adjuster 1228, the tension adjuster 1328, the tension adjuster 1428, the tension adjuster 1528, the tension adjuster 1728, the tension adjuster 1828, and the tension adjuster 1928.

The process 2050 may be implemented using a controller that executes computer program instructions. For example, the computer program instructions can be stored using a non-transitory computer-readable media, such as a hard disk drive, a solid state drive, a flash drive, an optical disk, or other type of device. The computer program instructions are executable by one or more processors that are included in the controller. The one or more processors may include, as example, one or more CPUs, one or more GPUs, one or more field-programmable gate arrays, one or more application specific integrated circuits, and/or any other type of general purpose or special purpose processing device. When the computer program instructions are executed by the one or more processors of the controller, the instructions cause the one or more processors to perform the instructions that are described herein.

Operation 2051 includes obtaining information from sensors. As an example, the sensors may be the sensors 116 of the head-mounted device 100. The information obtained from the sensors may be of any type, including the information described with respect to the sensors described in connection with the tension controller 126, the tension controller 526, the tension controller 626, the tension controller 726, the tension controller 826, the tension controller 1026, the tension controller 1126, and the tension controller 1226.

Operation 2052 includes determining a tensioning command. The tensioning command is determined in response to conditions that are observed, for example, by determining the tensioning command based on the information obtained in operation 2051. The tensioning command may be determined in the manners described with respect to the tensioning command 538, the tensioning command 638, the tensioning command 738, the tensioning command 838, the tensioning command 1038, the tensioning command 1138, and/or the tensioning command 1238. As one example, the values for each type of sensor output may be associated with a factor scale that converts the output to a factor. The factors for one or more sensors are converted to a final factor value. The factor value may be converted to a tension value according to a predetermined relationship to determine the tensioning command. The factor value may be used to determine a state such as a first tension value or a second tension value by comparison to a threshold value in order to determine the tensioning command. Other techniques may be used to determine the tensioning command based on observations (such as the sensor information from operation 2051).

Operation 2053 includes controlling a tension adjuster according to the tensioning command that was determined in operation 2052. The tensioning command is output to the tension adjuster, which applies tension according to the command. For example, the tensioning command may be a signal having a magnitude, and tension may be applied in correspondence to the signal. For example, the tensioning command may be a digital signal (e.g., on/off) and tension may be applied at a first tension value (e.g., zero) or a second values (e.g., a non-zero value) according to the digital signal. As examples, tension may be applied using the tension adjuster 128, the tension adjuster 528, the tension adjuster 628, the tension adjuster 728, the tension adjuster 828, the tension adjuster 1028, the tension adjuster 1128, the tension adjuster 1228, the tension adjuster 1328, the tension adjuster 1428, the tension adjuster 1528, the tension adjuster 1728, the tension adjuster 1828, the tension adjuster 1928, and/or any other tension adjusting device.

Figure 21:
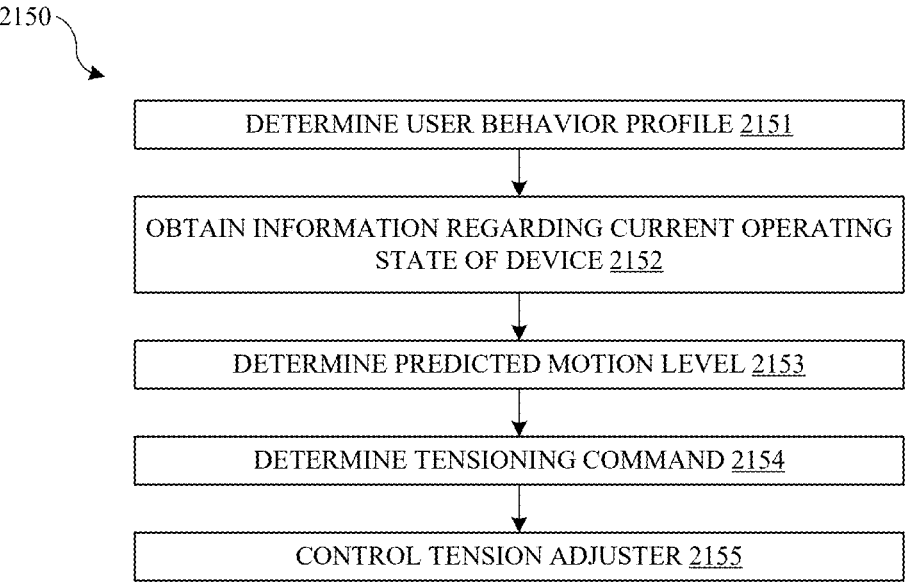
FIG. 21 is a flowchart that shows a process for controlling tension of a head-mounted device according to a second example.

FIG. 21 is a flowchart that shows a process 2150 for controlling tension of a head-mounted device according to a second example. The process 2150 can be performed using the head-mounted devices described herein, including the head-mounted device 100, the head-mounted device 200, the head-mounted device 300, and the head-mounted device 400.

The process 2150 may include use of the tensioning devices, tension controllers, and tension adjusters that are described herein, such as the tensioning device 124, the tensioning device 224, the tensioning device 324, the tensioning device 424, the tension controller 126, the tension controller 526, the tension controller 626, the tension controller 726, the tension controller 826, the tension controller 1026, the tension controller 1126, the tension controller 1226, the tension adjuster 128, the tension adjuster 528, the tension adjuster 628, the tension adjuster 728, the tension adjuster 828, the tension adjuster 1028, the tension adjuster 1128, the tension adjuster 1228, the tension adjuster 1328, the tension adjuster 1428, the tension adjuster 1528, the tension adjuster 1728, the tension adjuster 1828, and the tension adjuster 1928.

The process 2150 may be implemented using a controller that executes computer program instructions. For example, the computer program instructions can be stored using a non-transitory computer-readable media, such as a hard disk drive, a solid state drive, a flash drive, an optical disk, or other type of device. The computer program instructions are executable by one or more processors that are included in the controller. The one or more processors may include, as example, one or more CPUs, one or more GPUs, one or more field-programmable gate arrays, one or more application specific integrated circuits, and/or any other type of general purpose or special purpose processing device. When the computer program instructions are executed by the one or more processors of the controller, the instructions cause the one or more processors to perform the instructions that are described herein.

Operation 2151 includes determining a user behavior profile. The user behavior profile includes information that describes observed states over an extended time period (e.g., greater than one day). The user behavior profile may include sets of device states and corresponding expected motion levels (e.g., accelerations and velocities). As one example, the user behavior profile can include information that describes typical usage of the device by the user at particular times of day, such as by describing acceleration and/or velocity magnitudes or patterns that are typically seen at certain times of day. As another example, the user behavior data can include use case information that correlates particular observed states or combinations of observed states with information that describes acceleration and/or velocity magnitudes or patterns. The information included in the user behavior profile may be obtained over an extended time period using information recorded during usage of the device including, for example, application usage states and other metadata from a controller of the device and sensor observations obtained from sensors, as described with respect to the sensors 116.

Operation 2152 includes obtaining information regarding a current operating state of the device. As an example, the information may be obtained from sensors, which may be the sensors 116 of the head-mounted device 100, or from a controller of the head-mounted device 100. The information obtained from the sensors may be of any type, including the information described with respect to the sensors described in connection with the tension controller 126, the tension controller 526, the tension controller 626, the tension controller 726, the tension controller 826, the tension controller 1026, the tension controller 1126, and the tension controller 1226.

Operation 2153 includes determining a predicted motion level (e.g., a motion prediction) based on the user behavior profile and the information obtained in operation 2152. As one example, the predicted motion level may be determined using a matching algorithm that selects one of the sets of use case information by selecting one of the sets of the use case information having device states that are a best match for the current operating states of the device, and setting the predicted motion level based on the observed motion level from the use case information. As another example, the user behavior profile can be used to train a machine learning model that is configured to determine the predicted motion level based on the current operating state of the device.

Operation 2154 includes determining a tensioning command. The tensioning command is determined based on the predicted motion level determined in operation 2153. As examples, a function or lookup table may be used to determine the tensioning command based on the predicted motion level. Other techniques may be used to determine the tensioning command based on the predicted motion level.

Operation 2155 includes controlling a tension adjuster according to the tensioning command that was determined in operation 2154. The tensioning command is output to the tension adjuster, which applies tension according to the command. For example, the tensioning command may be a signal having a magnitude, and tension may be applied in correspondence to the signal. For example, the tensioning command may be a digital signal (e.g., on/off) and tension may be applied at a first tension value (e.g., zero) or a second values (e.g., a non-zero value) according to the digital signal. As examples, tension may be applied using the tension adjuster 128, the tension adjuster 528, the tension adjuster 628, the tension adjuster 728, the tension adjuster 828, the tension adjuster 1028, the tension adjuster 1128, the tension adjuster 1228, the tension adjuster 1328, the tension adjuster 1428, the tension adjuster 1528, the tension adjuster 1728, the tension adjuster 1828, the tension adjuster 1928, and/or any other tension adjusting device.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to adjust the fit and comfort of a head-mounted device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores fit and comfort related information that allows the head-mounted device to be actively adjusted for a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to allow automatic adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fit and comfort related parameters may be determined each time the head-mounted device is used, such as by scanning a user's face as they place the device on their head, and without subsequently storing the information or associating with the particular user.

What is claimed is:

1. A head-mounted device, comprising:
a display device that is configured to display content to a user;
a support structure that includes temple portions that are connected to the display device to support the display device with respect to the user;
a passive tensioning component that is configured to apply a biasing force to urge the temple portions to pivot toward a head of the user;
a sensor that generates a sensor output signal; and
an active tensioning component that is configured to move the temple portions to pivot further toward the head of the user based on the sensor output signal in order to restrain motion of the display device with respect to the user.

2. The head-mounted device of claim 1, further comprising:
a tension adjuster that is configured to control curvature of the temple portions based on the sensor output signal.

3. The head-mounted device of claim 2, wherein the temple portions are configured to change shape between normal positions and curved positions based on tension applied by the tension adjuster.

4. The head-mounted device of claim 2, wherein the tension adjuster comprises cables configured to apply tension along lengths of the temple portions.

5. The head-mounted device of claim 1, wherein the temple portions are pivotable with respect to the display device using a hinge structure.

6. The head-mounted device of claim 5, wherein the active tensioning component is configured to apply torque to the hinge structure to pivot the temple portions toward the head of the user with respect to the display device.

7. The head-mounted device of claim 6, wherein the passive tensioning component is configured to apply a biasing force to the hinge structure to pivot the temple portions toward the head of the user with respect to the display device.

8. The head-mounted device of claim 1, wherein an amount of tension applied by the active tensioning component varies from no tension to a tension greater than that applied by the passive tensioning component.

9. A head-mounted device, comprising:
a display device that is configured to display content to a user;
a support structure including a first contact pad configured to engage a first side of a nose of the user and a second contact pad configured to engage a second side of the nose of the user to support the display device with respect to a face of the user;
a sensor that generates a sensor output signal; and
a tension adjuster configured to move the first contact pad and the second contact pad toward each other and away from the support structure based on the sensor output signal to restrain motion of the display device with respect to the nose of the user.

10. The head-mounted device of claim 9, wherein the tension adjuster includes an actuator configured to urge the first contact pad and the second contact pad into engagement with the nose of the user at a variable tension based on the sensor output signal.

11. The head-mounted device of claim 10, wherein the first contact pad and the second contact pad each include a resilient structure configured to allow comfortable engagement of the display device to the nose of the user.

12. The head-mounted device of claim 9, wherein the sensor is a pressure sensor located on one or more of the first contact pad or the second contact pad and configured to measure pressure applied by the one or more of the first contact pad or the second contact pad to the nose of the user.

13. The head-mounted device of claim 9, wherein the tension adjuster is configured to vary tension by clamping and unclamping the first contact pad and the second contact pad relative to the nose of the user.

14. A head-mounted device, comprising:
a display device that is configured to display content to a user;
a support structure connected to the display device and configured to support the display device with respect to a body portion of a user;
contact features configured to selectively deploy from the support structure;
a sensor that generates a sensor output signal associated with an interaction of the support structure and the body portion of the user, wherein the sensor is at least one of a capacitive touch sensor, a pressure sensor, or a proximity sensor; and
a tension adjuster that is configured to selectively deploy the contact features based on the sensor output signal in order to restrain motion of the display device with respect to the body portion of the user,
wherein the contact features include a vibrating component configured to vibrate the tension adjuster with respect to the body portion of the user in order to oppose motion of the display device with respect to the body portion of the user.

15. The head-mounted device of claim 14, wherein the contact features are movable between a retracted position located at least partially within the support structure and a deployed position where the contact features extend from the support structure.

16. The head-mounted device of claim 15, wherein the contact features are not engaged with the body portion of the user in the retracted position and the contact features are engaged with the body portion of the user in the deployed position.

17. The head-mounted device of claim 15, wherein the contact features are engaged with and apply a first magnitude of force to the body portion of the user in the retracted position and the contact features are engaged with and apply a second magnitude of force to the body portion of the user in the deployed position, wherein second magnitude of force is greater than the first magnitude of force.

18. The head-mounted device of claim 14, wherein the contact features include surfaces having a higher friction value than a surface of the support structure.

19. The head-mounted device of claim 14, wherein the contact features include microstructures that are configured to cause motion in a specific direction when vibrated.

20. The head-mounted device of claim 19, wherein the microstructures are bristle-like structures or hair-like structures.

* * * * *